(12) United States Patent
Kwon et al.

(10) Patent No.: US 10,904,551 B2
(45) Date of Patent: Jan. 26, 2021

(54) VIDEO CODING USING INTRA BLOCK COPY

(71) Applicant: Texas Instruments Incorporated, Dallas, TX (US)

(72) Inventors: Do-Kyoung Kwon, Allen, TX (US); Madhukar Budagavi, Plano, TX (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 506 days.

(21) Appl. No.: 14/229,839

(22) Filed: Mar. 29, 2014

(65) Prior Publication Data
US 2014/0301465 A1 Oct. 9, 2014

Related U.S. Application Data

(60) Provisional application No. 61/847,743, filed on Jul. 18, 2013, provisional application No. 61/808,872, filed on Apr. 5, 2013.

(51) Int. Cl.
| | |
|---|---|
| H04N 19/503 | (2014.01) |
| H04N 19/107 | (2014.01) |
| H04N 19/109 | (2014.01) |
| H04N 19/43 | (2014.01) |
| H04N 19/593 | (2014.01) |

(52) U.S. Cl.
CPC ......... *H04N 19/503* (2014.11); *H04N 19/107* (2014.11); *H04N 19/109* (2014.11); *H04N 19/43* (2014.11); *H04N 19/593* (2014.11)

(58) Field of Classification Search
CPC ....... H04N 19/00684; H04N 19/00733; H04N 19/53; H04N 19/533; H04N 19/503; H04N 19/107; H04N 19/109; H04N 19/43; H04N 19/593

USPC .................................................. 375/240.16
See application file for complete search history.

(56) References Cited

U.S. PATENT DOCUMENTS

| | | | | |
|---|---|---|---|---|
| 8,767,817 B1* | 7/2014 | Xu | ........................ | H04N 19/105 |
| | | | | 375/240 |
| 8,867,614 B2* | 10/2014 | Shiodera | .............. | H04N 19/176 |
| | | | | 375/240.03 |
| 9,167,268 B1* | 10/2015 | Gu | ........................ | H04N 19/172 |
| 9,380,298 B1* | 6/2016 | Gu | ......................... | H04N 19/00 |

(Continued)

OTHER PUBLICATIONS

Gary J. Sullivan et al, "Overview of the High Efficiency Video Coding (HEVC) Standard", IEEE Transactions on Circuits and Systems for Video Technology, vol. 22, No. 12, Dec. 2012, pp. 1649-1667.

(Continued)

*Primary Examiner* — Tung T Vo
(74) *Attorney, Agent, or Firm* — Ebby Abraham; Charles A. Brill; Frank D. Cimino

(57) ABSTRACT

A method for decoding encoded blocks of pixels from an encoded video bit stream is provided that includes decoding a block vector corresponding to an encoded block of pixels from the encoded bit stream, verifying that the block vector indicates a block of reconstructed pixels in a search area including reconstructed pixels of a largest coding unit (LCU) including the encoded block of pixels and N left neighboring reconstructed LCUs of the LCU, and decoding the encoded block of pixels, wherein the block of reconstructed pixels is used as a predictor for the encoded block of pixels.

9 Claims, 7 Drawing Sheets

(56) References Cited

U.S. PATENT DOCUMENTS

| | | | | |
|---|---|---|---|---|
| 9,473,777 B2* | 10/2016 | Kim | | H04N 19/593 |
| 9,628,790 B1* | 4/2017 | Xu | | H04N 19/00569 |
| 2001/0017942 A1* | 8/2001 | Kalevo | | H04N 19/593 |
| | | | | 382/238 |
| 2003/0202588 A1 | 10/2003 | Yu et al. | | |
| 2005/0047504 A1* | 3/2005 | Sung | | H04N 19/105 |
| | | | | 375/240.2 |
| 2006/0072676 A1* | 4/2006 | Gomila | | H04N 19/61 |
| | | | | 375/240.27 |
| 2007/0237228 A1* | 10/2007 | Han | | H04N 19/105 |
| | | | | 375/240.12 |
| 2010/0061447 A1* | 3/2010 | Tu | | H04N 21/234381 |
| | | | | 375/240.03 |
| 2010/0177585 A1* | 7/2010 | Rubinstein | | G06F 13/1663 |
| | | | | 365/230.05 |
| 2010/0177828 A1* | 7/2010 | Rubinstein | | G06F 15/8015 |
| | | | | 375/240.26 |
| 2010/0220215 A1* | 9/2010 | Rubinstein | | G06F 15/8015 |
| | | | | 348/231.99 |
| 2010/0239015 A1* | 9/2010 | Wang | | H04N 19/197 |
| | | | | 375/240.16 |
| 2010/0246682 A1* | 9/2010 | Zhao | | H04N 19/56 |
| | | | | 375/240.16 |
| 2011/0044550 A1* | 2/2011 | Tian | | H04N 19/597 |
| | | | | 382/238 |
| 2011/0274162 A1* | 11/2011 | Zhou | | H04N 19/176 |
| | | | | 375/240.03 |
| 2012/0082223 A1* | 4/2012 | Karczewicz | | H04N 19/196 |
| | | | | 375/240.12 |
| 2012/0106622 A1* | 5/2012 | Huang | | H04N 19/129 |
| | | | | 375/240.01 |
| 2012/0106624 A1* | 5/2012 | Huang | | H04N 19/117 |
| | | | | 375/240.02 |
| 2012/0128064 A1* | 5/2012 | Sato | | H04N 19/13 |
| | | | | 375/240.03 |
| 2012/0134416 A1* | 5/2012 | Lin | | H04N 19/52 |
| | | | | 375/240.16 |
| 2012/0177118 A1* | 7/2012 | Karczewicz | | H04N 19/137 |
| | | | | 375/240.13 |
| 2012/0236941 A1* | 9/2012 | Lin | | H04N 19/513 |
| | | | | 375/240.16 |
| 2012/0281142 A1* | 11/2012 | Pettersson | | H04N 17/004 |
| | | | | 348/553 |
| 2012/0320975 A1* | 12/2012 | Kim | | H04N 19/593 |
| | | | | 375/240.12 |
| 2013/0022119 A1* | 1/2013 | Chien | | H04N 19/159 |
| | | | | 375/240.16 |
| 2013/0034157 A1* | 2/2013 | Helle | | H04N 19/53 |
| | | | | 375/240.12 |
| 2013/0101039 A1* | 4/2013 | Florencio | | H04N 19/176 |
| | | | | 375/240.16 |
| 2013/0107941 A1* | 5/2013 | Kazui | | H04N 19/176 |
| | | | | 375/240.03 |
| 2013/0128972 A1* | 5/2013 | Yamaguchi | | H04N 19/44 |
| | | | | 375/240.12 |
| 2013/0136172 A1* | 5/2013 | Lim | | H04N 19/196 |
| | | | | 375/240.03 |
| 2013/0136183 A1* | 5/2013 | Kim | | H04N 19/52 |
| | | | | 375/240.16 |
| 2013/0156106 A1* | 6/2013 | Sugio | | H04N 19/56 |
| | | | | 375/240.16 |
| 2013/0272404 A1* | 10/2013 | Park | | H04N 19/56 |
| | | | | 375/240.15 |
| 2014/0044166 A1* | 2/2014 | Xu | | H04N 19/61 |
| | | | | 375/240.16 |
| 2014/0126645 A1* | 5/2014 | Lim | | H04N 19/105 |
| | | | | 375/240.16 |
| 2014/0161177 A1* | 6/2014 | Sim | | H04N 19/70 |
| | | | | 375/240.03 |
| 2014/0226721 A1* | 8/2014 | Joshi | | H04N 19/159 |
| | | | | 375/240.13 |
| 2014/0355690 A1* | 12/2014 | Choi | | H04N 19/176 |
| | | | | 375/240.24 |
| 2014/0362912 A1* | 12/2014 | Sjoberg | | A63B 53/047 |
| | | | | 375/240.12 |
| 2015/0110181 A1* | 4/2015 | Saxena | | H04N 19/176 |
| | | | | 375/240.12 |
| 2015/0131724 A1* | 5/2015 | Lin | | H04N 19/56 |
| | | | | 375/240.14 |
| 2015/0288983 A1* | 10/2015 | Koo | | H04N 19/597 |
| | | | | 375/240.12 |

OTHER PUBLICATIONS

"TMS320DM6467 Digital Media System-on-Chip", SPRS403G, Texas Instruments Incorporated, Dec. 2007, revised Oct. 2010, pp. 1-355.

Jiheng Yang et al, "A Block-Matching Based Intra Frame Prediction for H.264/AVC", 2006 IEEE International Conference on Multimedia and Expo, Jul. 9-12, 2006, Toronto, Ontario, Canada, pp. 705-708.

David Flynn et al, "High Efficiency Video Coding (HEVC) Range Extensions Text Specification: Draft 6", JCTVC-P1005_v1, Joint Collaborative Team on Video Coding (JCT-VC) of ITU-T SG 16 WP 3 and ISO/IEC JCT 1/SC 29/WG11, pp. 1-344, San Jose, CA, Jan. 9-17, 2014.

Ankur Saxena et al, "HEVC Range Extensions Core Experiment 3 (RCE3): Intra Prediction Techniques", JCTVC-N1123, Joint Collaborative Team on Video Coding (JCT-VC) of ITU-T SG 16 WP 3 and ISO/IEC JCT 1/SC 29/WG11, pp. 1-7, Vienna, Austria, Jul. 25-Aug. 2, 2013.

David Flynn et al, "High Efficiency Video Coding (HEVC) Range Extensions Text Specification: Draft 4", JCTVC-N1005_v1, pp. 1-310, Incheon, Korea, Apr. 18-26, 2013.

Chao Pang et al, "Non-RCE3: Intra Motion Compensation with 2-D MVs", JCTVC-N0256, Joint Collaborative Team on Video Coding (JCT-VC) of ITU-T SG 16 WP 3 and ISO/IEV JCT 1/SC 29/WG11, pp. 1-12, Vienna, Australia, Jul. 25-Aug 2, 2013.

Do-Kyoung Kwon and Madhukar Budagavi, "Non-RCE3: Intra Motion Compensation with Variable Length Intra MV Coding", JCTVC-N0206, Joint Collaborative Team on Video Coding (JCT-VC) of ITU-T SG 16 WP 3 and ISO/IEC JCT 1/SC 29/WG11, pp. 1-9, Vienna, Austria, Jul. 25-Aug. 2, 2013.

Do-Kyoung and Madhukar Budagavi, "RCE3: Results of Test 3.3 on Intra Motion Compensation", JCTVC-N0205, Joint Collaborative Team on Video Coding (JCT-VC) of ITU-T SG 16 WP 3 and ISO/IEC JCT 1/SC 29/WG11, pp. 1-8, Vienna, Austria, Jul. 25-Aug. 2, 2013.

Madhukar Budagavi and Do-Kyoung Kwon, "AHG3: Video Coding Using Intra Motion Compensation", JCTVC-M0350, Joint Collaborative Team on Video Coding (JCT-VC) of ITU-T SG 16 WP 3 and ISO/IEC JCT 1/SC 29/WG11, pp. 1-5, Incheon, Korea, Apr. 18-26, 2013.

Benjamin Bross et al, "High Efficiency Video Coding (HEVC) Text Specification Draft 10 (For FDIS & Last Call)", JCTVC-L1003_v34, Joint Collaborative Team on Video Coding (JCT-VC) of ITU-T SG 16 WP 3 and ISO/IEC JCT 1/SC 29/WG11, pp. 1-298, Geneva, Switzerland, Jan. 14-23, 2013.

Tao Lin et al, "AHG8: P2M Based Dual-Coder Extension of HEVC", JCTVC-L0303, Joint Collaborative Team on Video Coding (JCT-VC) of ITU-T SG 16 WP 3 and ISO/IEC JCT 1/SC 29/WG11, pp. 1-5, Geneva, Switzerland, Jan. 14-23, 2013.

Siu-Leong Yu and Christos Chrysafis, "New Intra Prediction using Intra-Macroblock Motion Compensation", JVT-C151, Joint Video Team (JVT) of ISO/IEC MPEG & ITU-T VCEG (ISO/IEC JTC1/SC29/WG11 and ITU-T SG16 Q.6, pp. 1-10, Fairfax, Virginia, May 6-10, 2002.

* cited by examiner

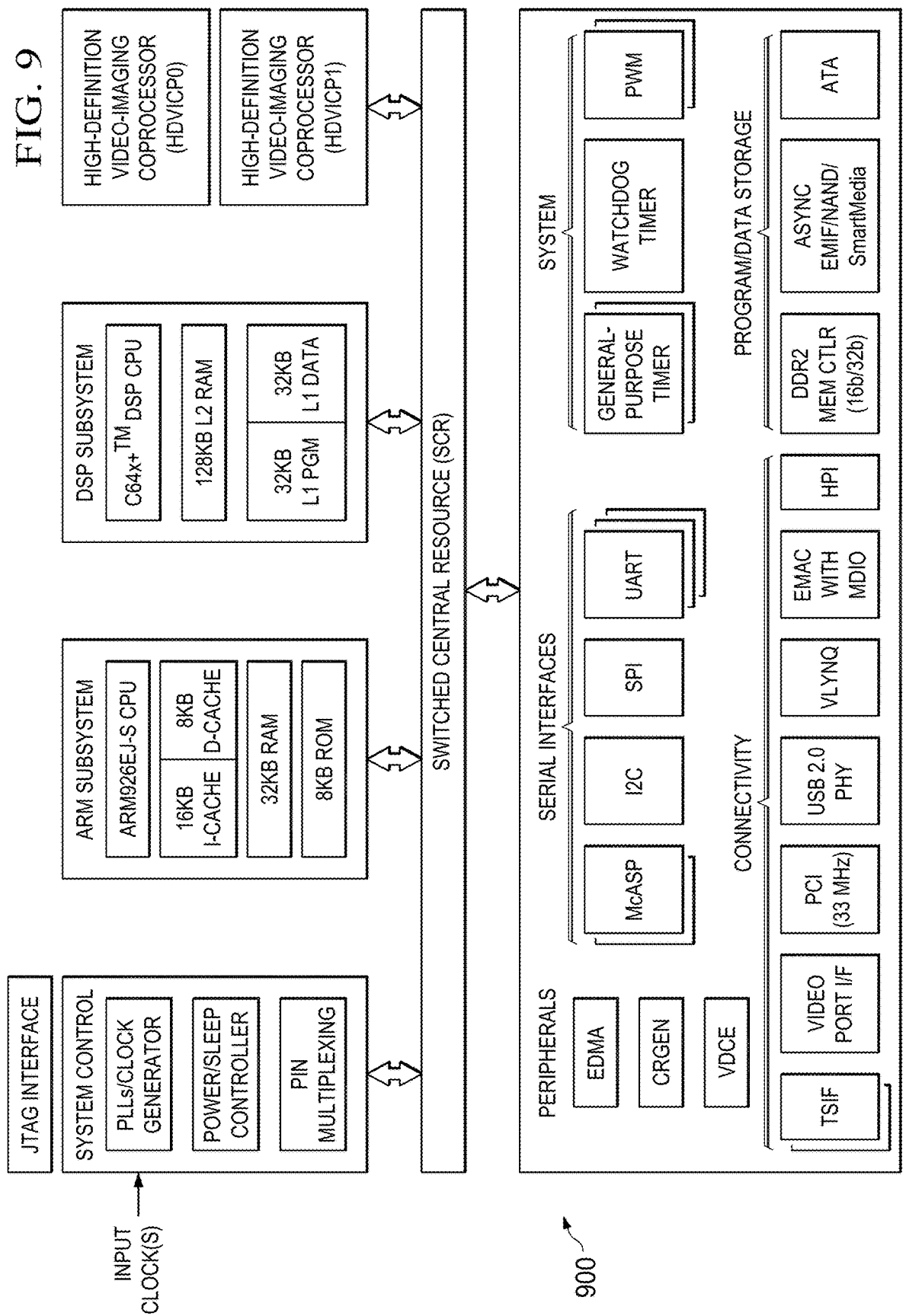

VIDEO CODING USING INTRA BLOCK COPY

CROSS-REFERENCE TO RELATED APPLICATIONS

This application claims benefit of U.S. Provisional Patent Application Ser. No. 61/808,872, filed Apr. 5, 2013, and U.S. Provisional Patent Application Ser. No. 61/847,743, filed Jul. 18, 2013, both of which are incorporated herein by reference in their entirety.

BACKGROUND OF THE INVENTION

Field of the Invention

Embodiments of the present invention generally relate to video coding using intra block copy.

Description of the Related Art

The Joint Collaborative Team on Video Coding (JCT-VC) of ITU-T WP3/16 and ISO/IEC JTC 1/SC 29/WG 11 has recently released the first version of the next-generation video coding standard referred to as High Efficiency Video Coding (HEVC). Similar to previous video coding standards such as H.264/AVC, HEVC is based on a hybrid coding scheme using block-based prediction and transform coding. First, the input signal is split into rectangular blocks that are predicted from the previously decoded data by either motion compensated (inter) prediction or intra prediction. The resulting prediction error is coded by applying block transforms based on an integer approximation of the discrete cosine transform, which is followed by quantization and coding of the transform coefficients.

HEVC Version 1 primarily focuses on 8-bit/10-bit YUV 4:2:0 video and provides 50% higher coding efficiency than its predecessor AVC/H.264. Standardization efforts, referred to as HEVC Range extensions (HEVC RExt), are currently underway in the JCT-VC to extend HEVC to support bit depths larger than 10 bits and color sampling of 4:2:2 and 4:4:4. Among the tools under consideration for HEVC RExt (or later versions) are tools for improving coding efficiency of screen content video. The work on screen content coding is motivated by the increasing popularity of applications such as wireless displays, remote desktop, remote gaming, distance education, cloud computing, automotive infotainment, etc. Video in such applications often has mixed content in a single picture that includes some combination of natural video, text, and graphics.

SUMMARY

Embodiments of the present invention relate to methods, apparatus, and computer readable media for video coding using intra block copy. In one aspect, a method for decoding encoded blocks of pixels from an encoded video bit stream is provided that includes decoding a block vector corresponding to the encoded block of pixels from the encoded bit stream, verifying that the block vector indicates a block of reconstructed pixels in a search area that includes reconstructed pixels of a largest coding unit (LCU) including the encoded block of pixels and N left neighboring reconstructed LCUs of the LCU, and decoding the encoded block of pixels, wherein the block of reconstructed pixels is used as a predictor for the encoded block of pixels.

In one aspect, a method for encoding blocks of pixels of a picture in a video sequence to generate portions of an encoded bit stream is provided that includes searching a search area of reconstructed pixels of the picture for a block of reconstructed pixels that best matches a block of pixels, wherein the search area includes reconstructed pixels of a largest coding unit (LCU) including the block of pixels and N left neighboring reconstructed LCUs of the LCU, encoding the block of pixels in the bit stream using the block of reconstructed pixels as a predictor for the block of pixels, and encoding a block vector in the bit stream, wherein the block vector indicates a location of the block of reconstructed pixels in the search area.

In one aspect, a method for decoding encoded blocks of pixels from an encoded video bit stream is provided that includes determining that a encoded block of pixels was encoded according to a block copy skip mode based on an indicator encoded in the bit stream, wherein a block vector and transform coefficients for the encoded block of pixels are not encoded in the bit stream, and decoding the encoded block of pixels using a block of reconstructed pixels as a predictor for the encoded block of pixels, wherein a block vector predictor is used as a block vector to locate the block of reconstructed pixels.

BRIEF DESCRIPTION OF THE DRAWINGS

Particular embodiments will now be described, by way of example only, and with reference to the accompanying drawings:

FIG. 9 is a block diagram of an illustrative digital system.

DETAILED DESCRIPTION OF EMBODIMENTS OF THE INVENTION

Figure 1:
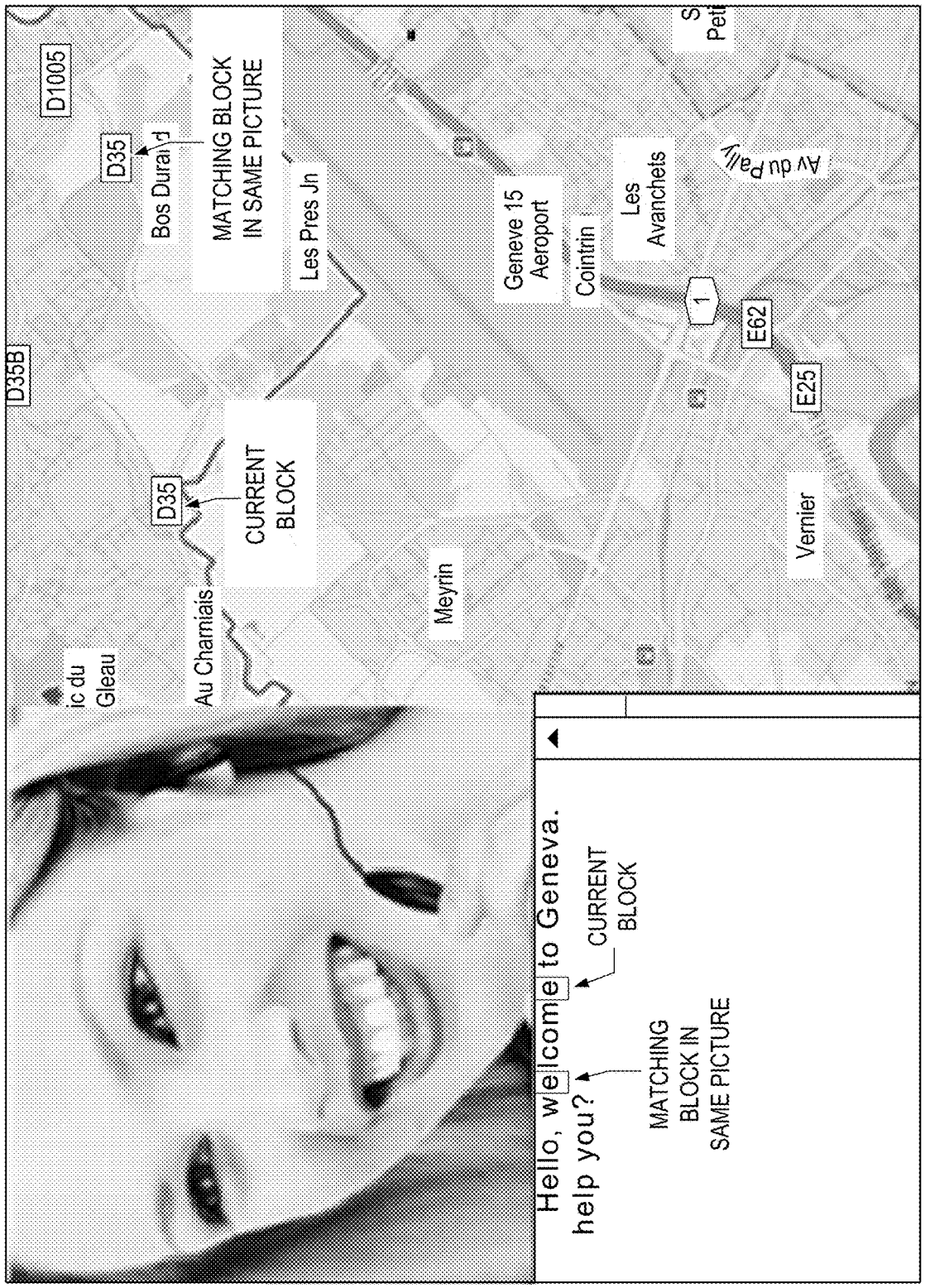
FIG. 1 is an example of mixed content video.

Specific embodiments of the invention will now be described in detail with reference to the accompanying figures. Like elements in the various figures are denoted by like reference numerals for consistency.

As used herein, the term "picture" may refer to a frame or a field of a frame. A frame is a complete image captured during a known time interval. For convenience of description, embodiments are described herein in reference to HEVC. One of ordinary skill in the art will understand that embodiments of the invention are not limited to HEVC.

In HEVC, a largest coding unit (LCU) is the base unit used for block-based coding. A picture is divided into non-overlapping LCUs. That is, an LCU plays a similar role in coding as the macroblock of H.264/AVC, but it may be larger, e.g., 32×32, 64×64, etc. An LCU may be partitioned into coding units (CU). A CU is a block of pixels within an LCU and the CUs within an LCU may be of different sizes. The partitioning is a recursive quadtree partitioning. The quadtree is split according to various criteria until a leaf is reached, which is referred to as the coding node or coding unit. The maximum hierarchical depth of the quadtree is determined by the size of the smallest CU (SCU) permitted. The coding node is the root node of two trees, a prediction tree and a transform tree. A prediction tree specifies the position and size of prediction units (PU) for a coding unit. A transform tree specifies the position and size of transform units (TU) for a coding unit. A transform unit may not be larger than a coding unit and the size of a transform unit may be, for example, 4×4, 8×8, 16×16, and 32×32. The sizes of the transforms units and prediction units for a CU are determined by the video encoder during prediction based on minimization of rate/distortion costs.

HEVC version 1 is described in B. Bross, et al., "High Efficiency Video Coding (HEVC) Text Specification Draft 10 (for FDIS & Last Call)," JCTVC-L1003_v34, Joint Collaborative Team on Video Coding (JCT-VC) of ITU-T SG16 WP3 and ISO/IEC JTC1/SC29/WG1, Geneva, CH, Jan. 14-23, 2013, which is incorporated by reference herein in its entirety. Versions of HEVC RExt are described in D. Flynn, et al., "High Efficiency Video Coding (HEVC) Range Extensions Text Specification: Draft 4," JCTVC-N1005_v1, Joint Collaborative Team on Video Coding (JCT-VC) of ITU-T SG16 WP3 and ISO/IEC JTC1/SC29/WG1, Incheon, KR, Apr. 18-26, 2013, and D. Flynn, et al., "High Efficiency Video Coding (HEVC) Range Extensions Text Specification: Draft 6," JCTVC-P1005_v1, Joint Collaborative Team on Video Coding (JCT-VC) of ITU-T SG16 WP3 and ISO/IEC JTC1/SC29/WG1, San Jose, Calif., Jan. 9-17, 2014, which are incorporated by reference herein in their entirety.

Some aspects of the disclosure have been presented to the JCT-VC in the following documents, which are incorporated by reference herein in their entirety: M. Budagavi and D. Kwon, "AHG8: Video Coding using Intra Motion Compensation," JCTVC-M0350, Joint Collaborative Team on Video Coding (JCT-VC) of ITU-T SG16 WP3 and ISO/IEC JTC1/SC29/WG1, Incheon, KR, Apr. 18-26, 2013, D. Kwon and M. Budagavi, "RCE3: Results of Test 3.3 on Intra Motion Compensation," JCTVC-N0205, Joint Collaborative Team on Video Coding (JCT-VC) of ITU-T SG16 WP3 and ISO/IEC JTC1/SC29/WG1, Vienna, AT, Jul. 25-Aug. 2, 2013, and D. Kwon and M. Budagavi, "Non-RCE3: Intra Motion Compensation with Variable Length Intra MV Coding," JCTVC-N0206, Joint Collaborative Team on Video Coding (JCT-VC) of ITU-T SG16 WP3 and ISO/IEC JTC1/SC29/WG1, Vienna, AT, Jul. 25-Aug. 2, 2013.

As previously mentioned, tools for improving coding efficiency of screen content video are under consideration for HEVC RExt (or later versions of HEVC). Such tools are important due to the increasing popularity of applications such as remote desktop, remote gaming, cloud computing, etc. Video content in such applications typically has mixed content that may include natural video, text, graphics etc. as illustrated in the example of FIG. 1. Graphics and text regions in pictures such as that of FIG. 1 have sharp edges that are sometimes not predicted well using intra prediction tools in current video coding standards, resulting in prediction error levels in intra coded blocks that are higher than those for natural video.

Embodiments of the invention provide for an intra prediction tool that improves coding efficiency of screen content video. The example frame of screen content video of FIG. 1 is dominated by text and graphics. As is highlighted in FIG. 1, areas of a screen content video frame having text and/or graphics may have repeating patterns. The intra prediction tool, referred to as intra block copy (IntraBC), exploits this redundancy to improve coding efficiency. In general, IntraBC is a block matching technique in which a block of samples, e.g., a coding unit (CU) or a prediction unit (PU), is predicted as a displacement from a reconstructed block of samples in a neighboring region in the same picture. Testing of some embodiments of IntraBC have shown it to be very effective for screen content video as it removes redundancy from repeating patterns which typically occur in text and graphics regions such as those illustrated in FIG. 1. More specifically, tests of embodiments of IntraBC have shown an average bit rate savings in the range of 2% to 44% for screen content video sequences.

The underlying idea of IntraBC is that a block of pixels, e.g., a CU or a PU, in a picture that is to be coded can be predicted from a previously coded and reconstructed block in the picture that best matches the block. A form of IntraBC was initially proposed for H.264/AVC in S. Yu and C. Chrysafis, "New Intra Prediction using Intra-Macroblock Motion Compensation," JVT-C151, Joint Video Team (JVT) of ISO/IEC MPEG & ITU-T VCEG (ISO/IEC JTC1/SC29/WG11 and ITU-T SG16 Q.6), Fairfax, Va., May 6-10, 2002. In this proposal, a macroblock in a picture may be predicted from a block anywhere in the partially reconstructed and padded picture. The average coding gain reported for this proposal for natural video was marginal while increasing memory size, memory bandwidth, and complexity for both encoding and decoding. A more recent IntraBC technique that showed promising coding efficiency results for screen content video is the dictionary-based approach described in T. Lin, et al., "AHG8: P2M Based Dual-Coder Extension of HEVC," JCTVC-L0303, Joint Collaborative Team on Video Coding (JCT-VC) of ITU-T SG16 WP3 and ISO/IEC JTC1/SC29/WG1, Geneva, CH, Jan. 14-23, 2013. In this technique, previously reconstructed pixels for an entire picture are stored in a dictionary and pixels for a CU being coded are predicted from a closely matched string in the dictionary. This technique increases encoding and decoding complexity and memory requirements and results in irregular block sizes.

Embodiments of the invention provide for IntraBC with reduced complexity and memory requirements as compared to prior art approaches by restricting the area of the reconstructed picture that is searched for a best match for prediction of a block of pixels, e.g., a CU or a PU, to be encoded to the reconstructed portion of the LCU that includes the block and N reconstructed LCUs to the left of that LCU, where N is a small integer and may be 0. Further, some embodiments include searching for the best matching block using two one-dimensional (1D) searches, one in the horizontal direction and one in the vertical direction. In other embodiments, a two-dimensional (2D) search is used to locate the best matching block. Different techniques for signaling of IntraBC information in the encoded bit stream are also provided in embodiments.

Figure 2:
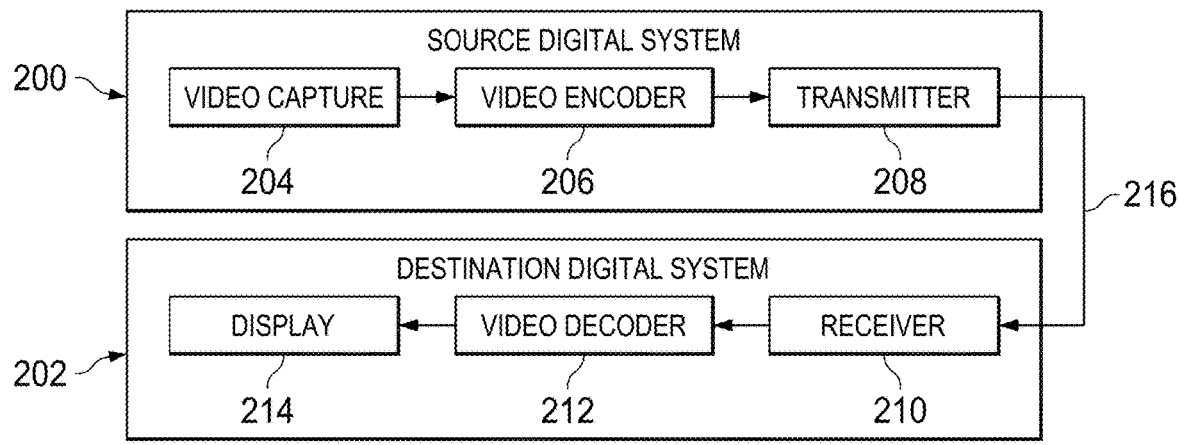
FIG. 2 is a block diagram of a digital system.

FIG. 2 shows a block diagram of a digital system that includes a source digital system 200 that transmits encoded video sequences to a destination digital system 202 via a communication channel 216. The source digital system 200 includes a video capture component 204, a video encoder component 206, and a transmitter component 208. The video capture component 204 is configured to provide a video sequence to be encoded by the video encoder component 206. The video capture component 204 may be, for example, a video camera, a video archive, or a video feed from a video content provider. In some embodiments, the video capture component 204 may generate computer graphics as the video sequence, or a combination of live video, archived video, and/or computer-generated video.

The video encoder component 206 receives a video sequence from the video capture component 204 and encodes it for transmission by the transmitter component 208. The video encoder component 206 receives the video sequence from the video capture component 204 as a sequence of pictures, divides the pictures into largest coding units (LCUs), and encodes the video data in the LCUs. The video encoder component 206 may be configured to perform IntraBC during the encoding process and signaling of IntraBC parameters in the encoded bit stream as described herein. An embodiment of the video encoder component 206 is described in more detail herein in reference to FIG. 3.

The transmitter component 208 transmits the encoded video data to the destination digital system 202 via the communication channel 216. The communication channel 216 may be any communication medium, or combination of communication media suitable for transmission of the encoded video sequence, such as, for example, wired or wireless communication media, a local area network, or a wide area network.

The destination digital system 202 includes a receiver component 210, a video decoder component 212 and a display component 214. The receiver component 210 receives the encoded video data from the source digital system 200 via the communication channel 216 and provides the encoded video data to the video decoder component 212 for decoding. The video decoder component 212 reverses the encoding process performed by the video encoder component 206 to reconstruct the LCUs of the video sequence. The video decoder component 212 may be configured to decode CUs encoded using IntraBC during the decoding process as described herein. An embodiment of the video decoder component 212 is described in more detail below in reference to FIG. 4.

The reconstructed video sequence is displayed on the display component 214. The display component 214 may be any suitable display device such as, for example, a plasma display, a liquid crystal display (LCD), a light emitting diode (LED) display, etc.

In some embodiments, the source digital system 200 may also include a receiver component and a video decoder component and/or the destination digital system 202 may include a transmitter component and a video encoder component for transmission of video sequences both directions for video streaming, video broadcasting, and video telephony. Further, the video encoder component 206 and the video decoder component 212 may perform encoding and decoding in accordance with one or more video compression standards. The video encoder component 206 and the video decoder component 212 may be implemented in any suitable combination of software, firmware, and hardware, such as, for example, one or more digital signal processors (DSPs), microprocessors, discrete logic, application specific integrated circuits (ASICs), field-programmable gate arrays (FPGAs), etc.

Figure 3:
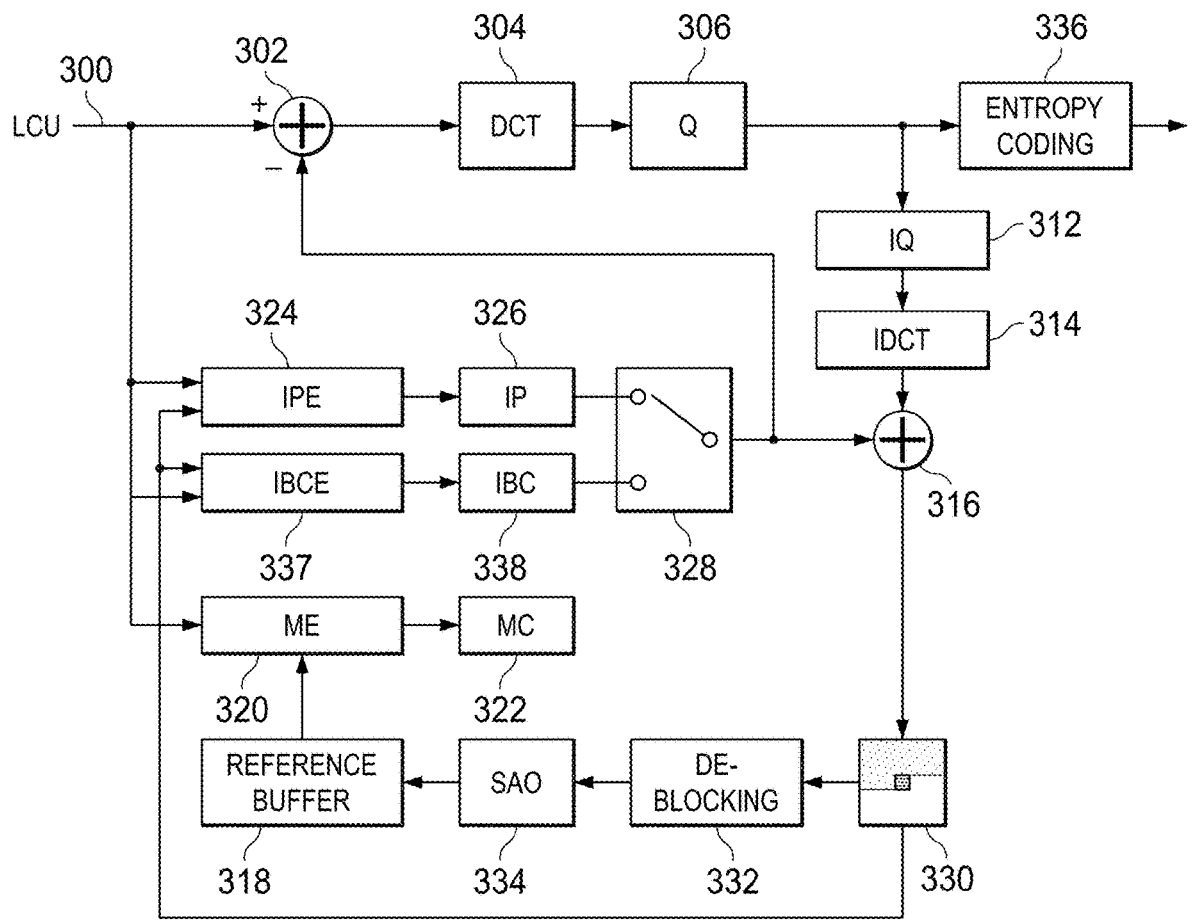
FIG. 3 is a block diagram of an example video encoder.

FIG. 3 is a block diagram of the LCU processing portion of an example video encoder providing IntraBC. The LCU processing receives LCUs 300 of an input video sequence from a coding control component (not shown) and encodes the LCUs 300 under the control of the coding control component to generate a compressed (encoded) video stream. The coding control component sequences the various operations of the video encoder, i.e., the coding control component runs the main control loop for video encoding. For example, the coding control component performs processing on the input video sequence that is to be done at the picture level, such as determining the coding type (I, P, or B) of a picture based on a high level coding structure, e.g., IPPP, IBBP, hierarchical-B, and dividing a picture into LCUs for further processing.

In addition, for pipelined architectures in which multiple LCUs may be processed concurrently in different components of the LCU processing, the coding control component controls the processing of the LCUs by various components of the LCU processing in a pipeline fashion. For example, in many embedded systems supporting video processing, there may be one master processor and one or more slave processing modules, e.g., hardware accelerators. The master processor operates as the coding control component and runs the main control loop for video encoding, and the slave processing modules are employed to off load certain compute-intensive tasks of video encoding such as motion estimation, motion compensation, intra prediction mode estimation, transformation and quantization, entropy coding, and loop filtering. The slave processing modules are controlled in a pipeline fashion by the master processor such that the slave processing modules operate on different LCUs of a picture at any given time. That is, the slave processing modules are executed in parallel, each processing its respective LCU while data movement from one processor to another is serial.

The LCUs 300 from the coding control component are provided as one input of a motion estimation component (ME) 320, as one input of an intra-prediction estimation component (IPE) 324, as one input of an IntraBC estimation (IBCE) component 337, and to a positive input of a combiner 302 (e.g., adder or subtractor or the like). Further, although not specifically shown, the prediction mode of each picture as selected by the coding control component is provided to a mode decision component 328 and the entropy coding component 336.

The reference buffer 318 provides reference data to the motion estimation component 320 and to the motion compensation component 322. The reference data may include one or more previously reconstructed and filtered pictures, i.e., reference pictures. The reconstructed picture buffer 330 provides reconstructed picture data for the picture currently being encoded to the IPE component 324, the IBCE component 337, and the de-blocking filter component 332.

The motion estimation component 320 provides motion data information to the motion compensation component 322 and the entropy coding component 336. More specifically, the motion estimation component 320 performs tests on CUs in an LCU based on multiple inter-prediction modes (e.g., skip mode, merge mode, and normal or direct inter-prediction), PU sizes, and TU sizes using reference picture data from the reference buffer 318 to choose the best CU partitioning, PU/TU partitioning, inter-prediction modes, motion vectors, etc. based on coding cost, e.g., a rate distortion coding cost. To perform the tests, the motion estimation component 320 may divide an LCU into CUs according to the maximum hierarchical depth of the quadtree, and divide each CU into PUs according to the unit sizes of the inter-prediction modes and into TUs according to the transform unit sizes, and calculate the coding costs for each PU size, prediction mode, and transform unit size for each CU. The motion estimation component 320 provides the motion vector (MV) or vectors and the prediction mode for each PU in the selected CU partitioning to the motion compensation component (MC) 322.

The motion compensation component 322 receives the selected inter-prediction mode and mode-related information from the motion estimation component 320 and generates the inter-predicted CUs. The inter-predicted CUs are provided to the mode decision component 328 along with the selected inter-prediction modes for the inter-predicted PUs and corresponding TU sizes for the selected CU/PU/TU partitioning. The coding costs of the inter-predicted CUs are also provided to the mode decision component 328.

The intra-prediction estimation component (IPE) 324 performs intra-prediction estimation in which tests on CUs in an LCU based on multiple intra-prediction modes, PU sizes, and TU sizes are performed using reconstructed data from previously encoded neighboring CUs stored in the reconstructed picture buffer 330 to choose the best CU partitioning, PU/TU partitioning, and intra-prediction modes based on coding cost, e.g., a rate distortion coding cost. To perform the tests, the intra-prediction estimation component 324 may divide an LCU into CUs according to the maximum hierarchical depth of the quadtree, and divide each CU into PUs according to the unit sizes of the intra-prediction modes and into TUs according to the transform unit sizes, and calculate the coding costs for each PU size, prediction mode, and transform unit size for each PU. The intra-prediction estimation component 324 provides the selected intra-prediction modes for the PUs and the corresponding TU sizes for the selected CU partitioning to the intra-prediction component (IP) 326. The coding costs of the intra-predicted CUs are also provided to the intra-prediction component 326.

The intra-prediction component (IP) 326 receives intra-prediction information, e.g., the selected mode or modes for the PU(s), the PU size, etc., from the intra-prediction estimation component 324 and generates the intra-predicted CUs. The intra-predicted CUs are provided to the mode decision component 328 along with the selected intra-prediction modes for the intra-predicted PUs and corresponding TU sizes for the selected CU/PU/TU partitioning. The coding costs of the intra-predicted CUs are also provided to the mode decision component 328.

The IntraBC estimation component (IBCE) 337 provides block data information to the IntraBC component (IBC) 338. More specifically, the IBCE 337 performs tests on CUs in an LCU based on allowed intra-prediction CU sizes, PU sizes, and TU sizes using reconstructed data from the picture being encoded stored in the reconstructed picture buffer 330 to choose the best CU partitioning and PU/TU partitioning based on coding cost, e.g., a rate distortion coding cost. To perform the tests, the IBCE component 337 may divide an LCU into CUs according to the maximum hierarchical depth of the quadtree, and divide each CU into PUs according to the unit sizes allowed for intra-prediction. For each PU, the IBCE component 337 searches for a best matching block of the same size in a specified search area of reconstructed samples of the picture being encoded. The best matching block may be used in encoding the PU. The IBCE component 337 further divides the CUs/PUs into TUs according to the transform unit sizes, and calculates the coding costs for each PU size and transform unit size for each PU. The coding cost for a PU may be based on the best matching block found for the PU. The intra-prediction estimation component 324 provides the block vectors for the PUs, and the corresponding TU sizes for the selected CU partitioning to the IntraBC component (IBC) 338. The coding costs of the IntraBC predicted CUs are also provided to the IBC component 338. A block vector is a two-dimensional vector that provides an offset from the coordinates of a PU to the coordinates of the best matching block in the search area. Searching for a best matching block and search areas are explained in more detail herein in reference to the method of FIG. 5.

The IntraBC component (IBC) 338 receives IntraBC information, e.g., the blocks vectors for the PU(s), the PU size, etc., from the IBCE component 337 and generates the IntraBC predicted CUs. The IBC component 338 may generate an IntraBC predicted block using a block vector as follows. If (x0, y0) is the top-left corner of a block of samples with width w and height h, and (bx, by) is the block vector for the best matching block of reconstructed samples, the IBC component 338 may copy a block of reconstructed samples of size (w×h) from location (x0-bx, y0-by) in the search area. The IntraBC predicted CUs are provided to the mode decision component 328 along with the corresponding TU sizes for the selected CU/PU/TU partitioning. The coding costs of the IntraBC predicted CUs are also provided to the mode decision component 328.

The mode decision component 328 selects between intra-prediction of a CU, IntraBC prediction of a CU, and inter-prediction of a CU based on the intra-prediction coding cost of the CU from the intra-prediction component 326, the inter-prediction coding cost of the CU from the motion compensation component 322, the IntraBC prediction coding cost of the CU from the IntraBC compensation component 338, and the picture prediction mode provided by the coding control component. Based on the decision as to whether a CU is to be intra-coded, inter-coded, or IntraBC-coded, the intra-predicted PUs, inter-predicted PUs, or IntraBC-predicted PUs are selected. The selected CU/PU/TU partitioning with corresponding modes and other mode related prediction data (if any) such as block vector(s), motion vector(s) and reference picture index (indices) are provided to the entropy coding component 336.

The output of the mode decision component 328, i.e., the predicted PUs, is provided to a negative input of the combiner 302 and to the combiner 338. The associated transform unit size is also provided to the transform component 304. The combiner 302 subtracts a predicted PU from the original PU. Each resulting residual PU is a set of pixel difference values that quantify differences between pixel values of the original PU and the predicted PU. The residual blocks of all the PUs of a CU form a residual CU for further processing.

The transform component 304 performs block transforms on the residual CUs to convert the residual pixel values to transform coefficients and provides the transform coefficients to a quantize component 306. More specifically, the transform component 304 receives the transform unit sizes for the residual CU and applies transforms of the specified sizes to the CU to generate transform coefficients. Further, the quantize component 306 quantizes the transform coefficients based on quantization parameters (QPs) and quantization matrices provided by the coding control component and the transform sizes and provides the quantized transform coefficients to the entropy coding component 336 for coding in the bit stream.

The entropy coding component 336 entropy encodes the relevant data, i.e., syntax elements, output by the various encoding components and the coding control component using context-adaptive binary arithmetic coding (CABAC) to generate the compressed video bit stream. Among the syntax elements that are encoded are picture parameter sets, slice headers, flags indicating the CU/PU/TU partitioning of an LCU, the prediction modes for the CUs, and the quantized transform coefficients for the CUs. The entropy coding component 336 also entropy encodes relevant data from the in-loop filters, such as the SAO parameters.

Further, for each CU, the entropy coding component 336 encodes a syntax element indicating whether or not the CU is coded in IntraBC mode. In some embodiments, for each CU encoded in IntraBC mode, the entropy coding component 336 encodes the block vector or vectors of the best matching block or blocks along with quantized transform coefficients of the CU. The block vector(s) may also be predicted and the predicted block vector(s) encoded. In some embodiments, an IntraBC skip mode is provided and the entropy coding component 336 encodes an IntraBC skip flag for each CU coded in IntraBC mode. In such embodiments, if the predicted block vector(s) of a CU are zero and the quantized transform coefficients of the CU are all 0, the entropy coding component 336 encodes an IntraBC skip flag set to indicate that encoding of the CU is "skipped," i.e., that the block vector(s) and quantized transform coefficients of the CU are not present in bit stream. Otherwise, the entropy coding component 336 encodes an IntraBC skip flag set to indicate that encoding of the CU is not skipped, i.e., that the block vector(s) and quantized transform coefficients of the CU are encoded in the bit stream. Encoding of block vectors and IntraBC skip mode are described in more detail herein in reference to the method of FIG. 5.

The LCU processing includes an embedded decoder. As any compliant decoder is expected to reconstruct an image from a compressed bit stream, the embedded decoder provides the same utility to the video encoder. Knowledge of the reconstructed input allows the video encoder to transmit the appropriate residual energy to compose subsequent pictures.

The quantized transform coefficients for each CU are provided to an inverse quantize component (IQ) 312, which outputs a reconstructed version of the transform result from the transform component 304. The dequantized transform coefficients are provided to the inverse transform component (IDCT) 314, which outputs estimated residual information representing a reconstructed version of a residual CU. The inverse transform component 314 receives the transform unit size used to generate the transform coefficients and applies inverse transform(s) of the specified size to the transform coefficients to reconstruct the residual values. The reconstructed residual CU is provided to the combiner 316.

The combiner 316 adds the original predicted CU to the residual CU to generate a reconstructed CU, which becomes part of reconstructed picture data. The reconstructed picture data is stored in the reconstructed picture buffer 330 for use by the IPE component 324, the IBCE component 337, and the de-blocking filter component 332.

Various in-loop filters may be applied to the reconstructed picture data to improve the quality of the reference picture data used for encoding/decoding of subsequent pictures. The in-loop filters may include a deblocking filter 332 and a sample adaptive offset filter (SAO) 334. The in-loop filters 332, 334 are applied to each reconstructed LCU in the picture and the final filtered reference picture data is stored in the reference buffer 318.

Figure 4:
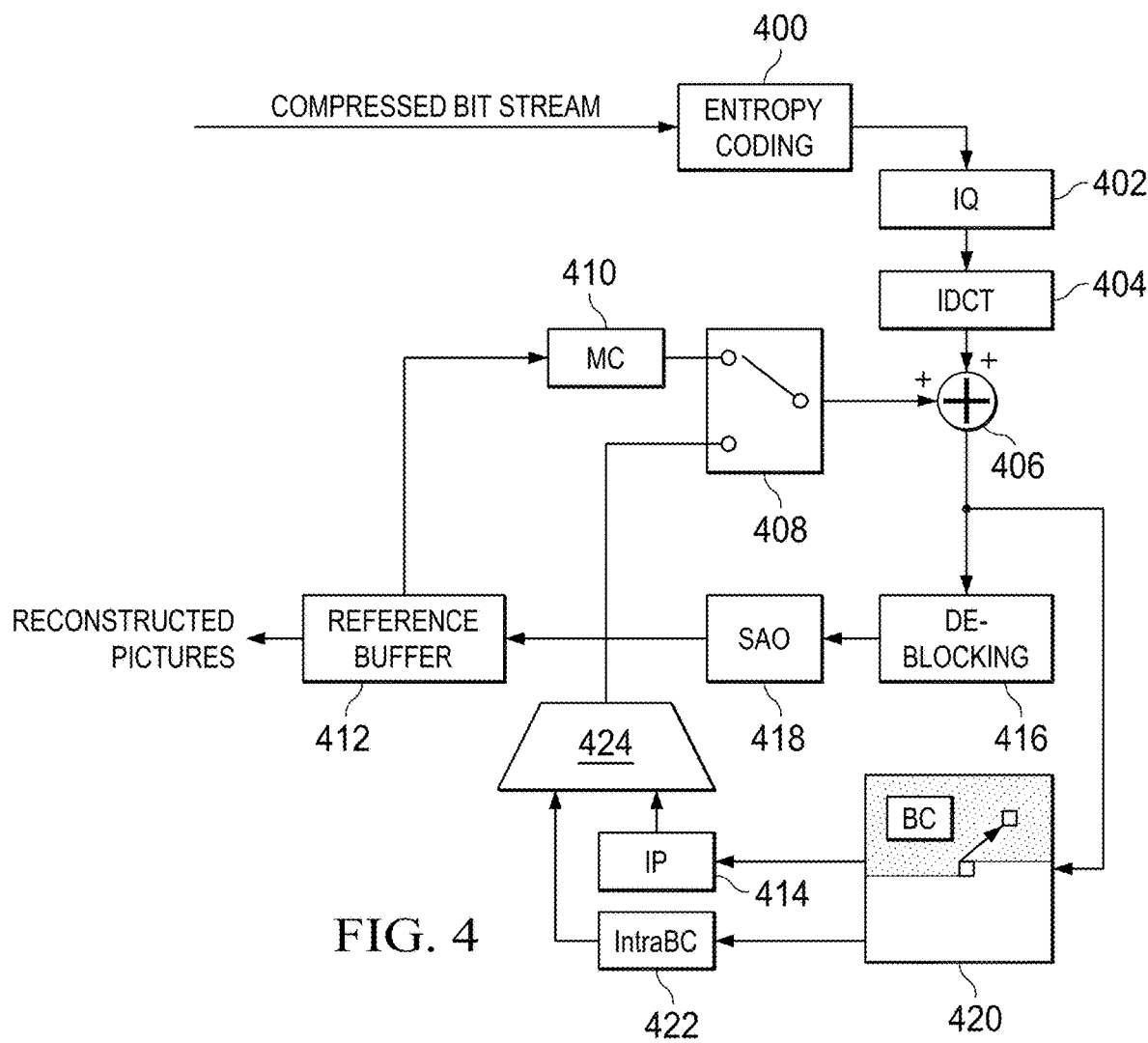
FIG. 4 is a block diagram of an example video decoder.

FIG. 4 is a block diagram of an example video decoder providing decoding of video sequences encoded using IntraBC. The video decoder operates to reverse the encoding operations, i.e., entropy coding, quantization, transformation, and prediction, performed by the video encoder of FIG. 3 to regenerate the pictures of the original video sequence. In view of the above description of a video encoder, one of ordinary skill in the art will understand the functionality of components of the video decoder without detailed explanation.

The entropy decoding component 400 receives an entropy encoded (compressed) video bit stream and reverses the entropy encoding using CABAC decoding to recover the encoded syntax elements, e.g., CU, PU, and TU structures of LCUs, quantized transform coefficients for CUs, motion vectors, block vectors, prediction modes, SAO parameters, etc. The decoded syntax elements are passed to the various components of the decoder as needed. For example, decoded prediction modes are provided to the intra-prediction component (IP) 414 or motion compensation component (MC) 410. If the decoded prediction mode is an inter-prediction mode, the entropy decoder 400 reconstructs the motion vector(s) as needed and provides the motion vector(s) to the motion compensation component 410. In some embodiments, if the decoded prediction mode for a CU is IntraBC mode, the entropy decoder 400 reconstructs the block vector (s) as needed and provides the block vector(s) to the IntraBC compensation component 422. Reconstruction of a block vector is described in more detail herein in reference to the method of FIG. 8.

In some embodiments, an IntraBC skip mode is provided and an IntraBC skip flag is coded in the bit stream for each CU coded in IntraBC mode. In such embodiments, if the decoded IntraBC skip flag indicates that encoding of the CU is skipped, i.e., the block vector(s) and quantized transform coefficients are not present in the bit stream, the entropy decoder 400 sets the block vector(s) to the block vector predictor(s) and provides the block vector(s) to the IntraBC compensation component 422. The entropy decoder 400 further indicates that the values of the residual CU are all 0. In other words, inverse quantization and inverse transformation are skipped as there are no quantized transform coefficients in the bit stream for the current CU. Otherwise, the entropy decoder 400 the entropy decoder 400 reconstructs the block vector(s) from the bit stream and provides the block vector(s) to the IntraBC compensation component 422 and decodes the quantized transform coefficients for the CU from the bit stream. Reconstruction of a block vector and IntraBC skip mode are described in more detail herein in reference to the method of FIG. 8.

The inverse quantize component (IQ) 402 de-quantizes the quantized transform coefficients of the CUs. The inverse transform component 404 transforms the frequency domain data from the inverse quantize component 402 back to the residual CUs. That is, the inverse transform component 404 applies an inverse unit transform, i.e., the inverse of the unit transform used for encoding, to the de-quantized residual coefficients to produce reconstructed residual values of the CUs.

A residual CU supplies one input of the addition component 406. The other input of the addition component 406 comes from the mode switch 408. When an inter-prediction mode is signaled in the encoded video stream, the mode switch 408 selects predicted PUs from the motion compensation component 410 and when an intra-prediction mode (one mode of which may be IntraBC) is signaled, the mode switch selects predicted PUs from the multiplexor 424. The multiplexor 424 selects predicted PUs from the IntraBC compensation component 422 when the signaled prediction mode is IntraBC and otherwise selects predicted PUs from the intra-prediction component 414.

The motion compensation component 410 receives reference data from the reference buffer 412 and applies the motion compensation computed by the encoder and transmitted in the encoded video bit stream to the reference data to generate a predicted PU. That is, the motion compensation component 410 uses the motion vector(s) from the entropy decoder 400 and the reference data to generate a predicted PU.

The intra-prediction component 414 receives reconstructed samples from previously reconstructed PUs of a current picture from the reconstructed picture buffer 420 and performs the intra-prediction computed by the encoder as signaled by an intra-prediction mode transmitted in the encoded video bit stream using the reconstructed samples as needed to generate a predicted PU.

The IntraBC component 422 receives reconstructed samples from previously reconstructed PUs of a current picture from the reconstructed picture buffer 420 and applies the block compensation computed by the encoder and transmitted in the encoded video bit stream to the reconstructed data to generate a predicted PU. That is, the IntraBC component 422 uses the block vector(s) from the entropy decoder 400 and the reconstructed samples indicated by the vector(s) to generate a predicted PU. Further, the IntraBC component 422 may verify that the block vector(s) are valid prior to using the block vector(s) to generate predicted PUs. A block vector is valid if the block indicated by the vector is within a region of the reconstructed samples of the picture specified by coding standard, e.g., HEVC. Validation of block vectors is described in more detail herein in reference to the method of FIG. 8.

The addition component 406 generates a reconstructed CU by adding the predicted PUs selected by the mode switch 408 and the residual CU. The output of the addition component 406, i.e., the reconstructed CUs, is stored in the reconstructed picture buffer for use by the intra-prediction component 414 and the IntraBC component 422.

In-loop filters may be applied to reconstructed picture data to improve the quality of the decoded pictures and the quality of the reference picture data used for decoding of subsequent pictures. The applied in-loop filters are the same as those of the encoder, i.e., a deblocking filter 416 and a sample adaptive offset filter (SAO) 418. The in-loop filters may be applied on an LCU-by-LCU basis and the final filtered reference picture data is provided to the reference buffer 412.

Figure 5:
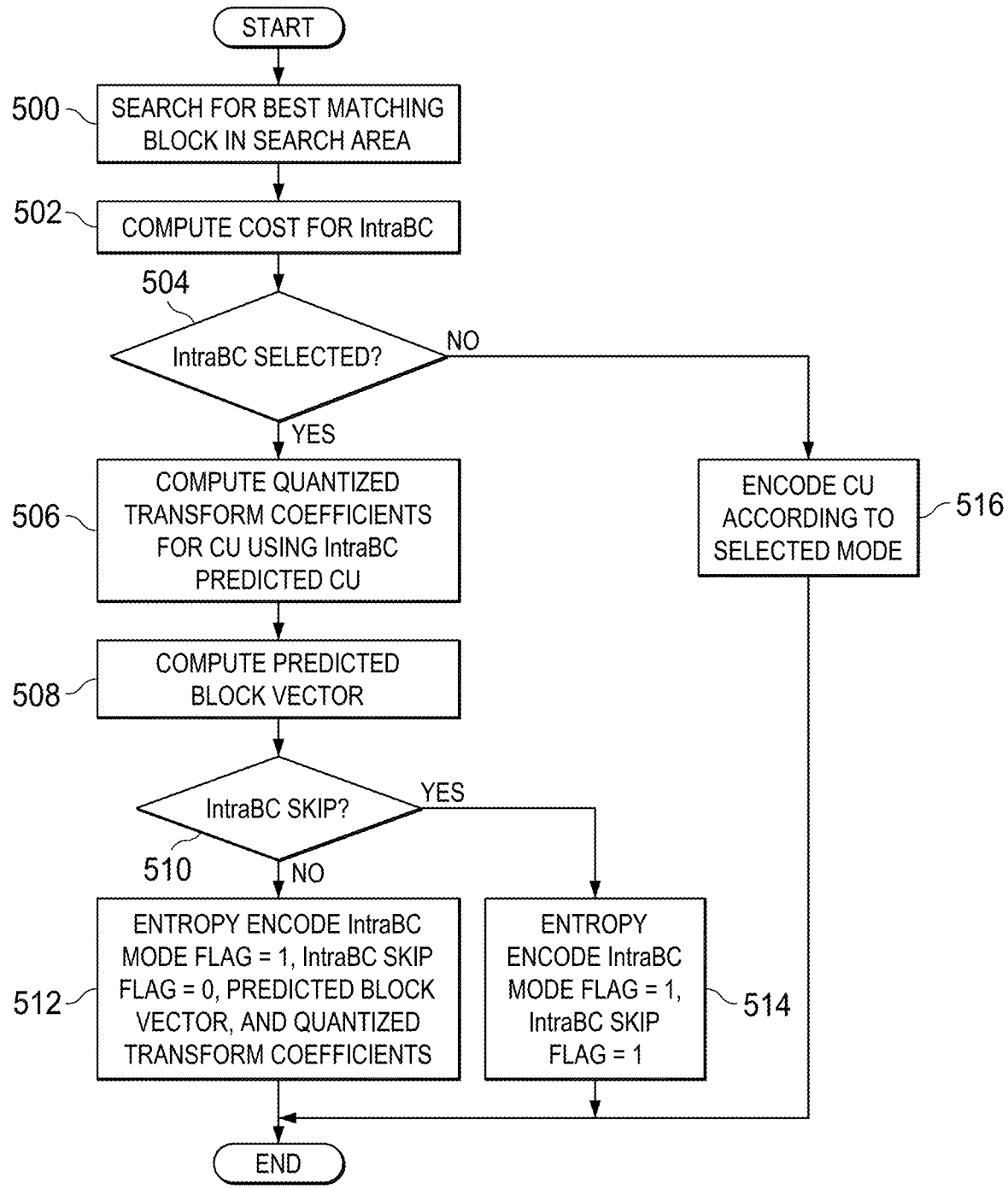
FIGS. 5 and 8 are flow diagrams of methods.

FIG. 5 is a flow diagram of a method for encoding a block of pixels of a picture in IntraBC mode that may be performed, for example, by the encoder of FIG. 3. For simplicity of explanation, the method is described assuming that the block of pixels is a CU and the CU is not further divided into PUs, i.e., CU=PU. One of ordinary skill in the art will understand embodiments in which a CU is divided into PUs. For example, one of ordinary skill will understand that in such embodiments, a search for a best matching block for each PU will be performed and each PU will have an associated block vector.

Figure 6:
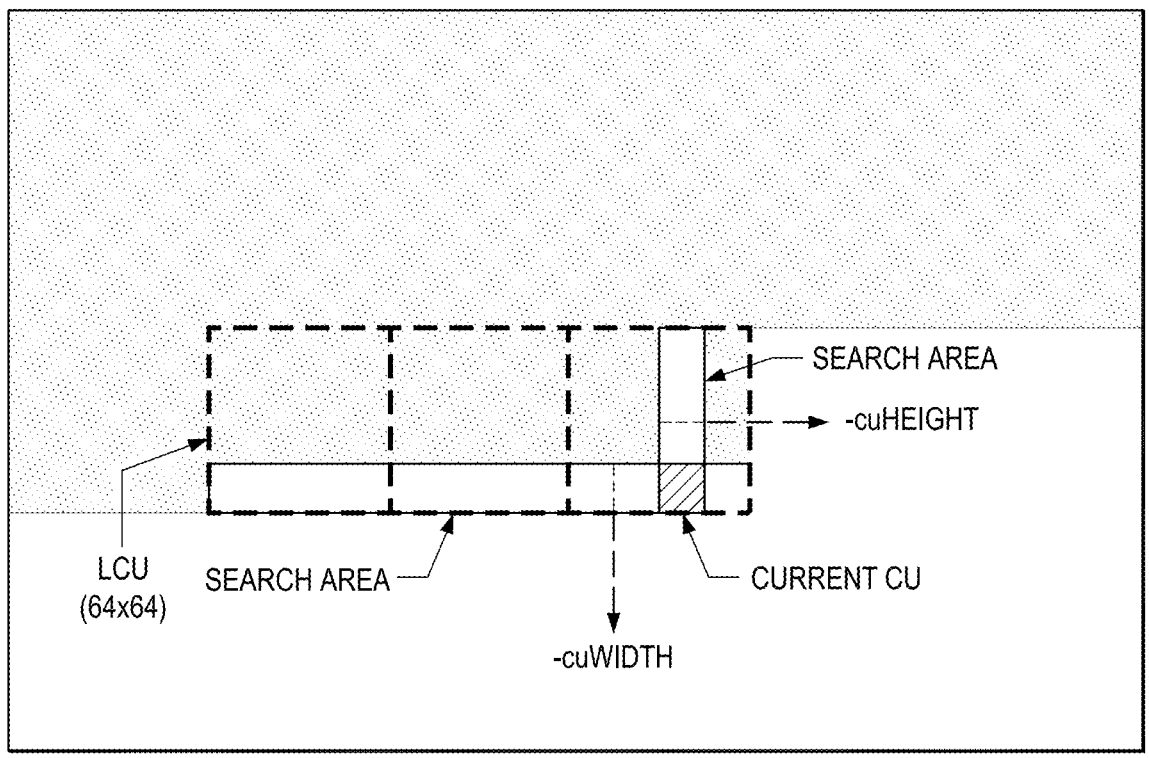
FIGS. 6 and 7 are examples.
Figure 7:
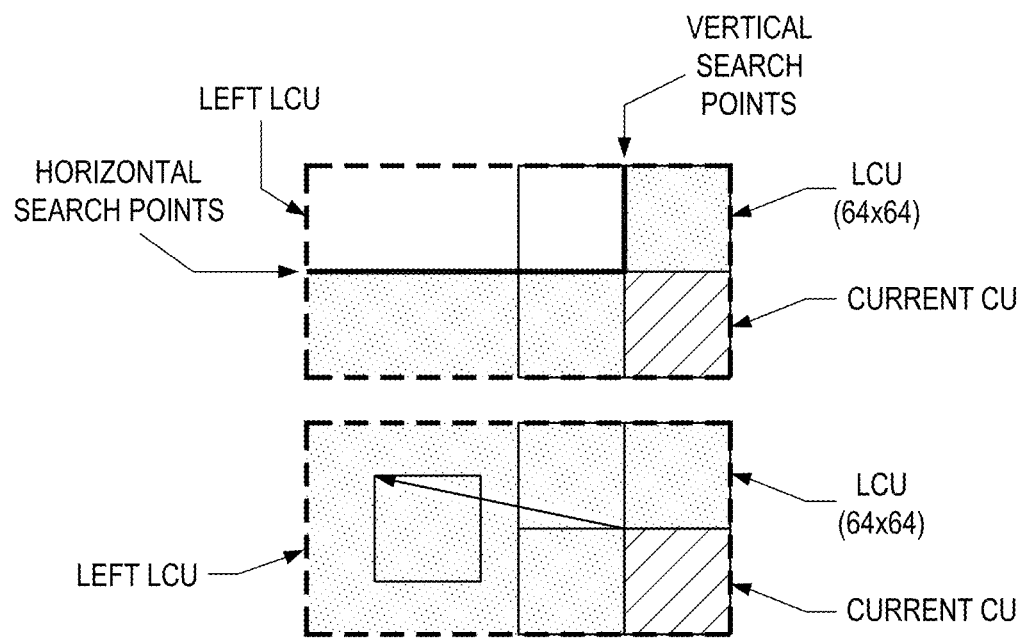

Initially, a search 500 is performed in a specified search area of reconstructed pixels of the picture to find a block of pixels that best matches the CU and a block vector is generated for the best matching block. As was previously mentioned, a block vector is a two-dimensional vector that provides an offset from the coordinates of a CU to the coordinates of the best matching block in the search area. The size of the specified search area may be set by the coding standard in use, e.g., HEVC. In some embodiments, the search area includes the reconstructed pixels of the LCU including the CU and N reconstructed left neighboring LCUs. In some such embodiments, N=0, i.e., the search area is limited to the reconstructed pixels of the LCU including the CU. In some such embodiments, N=1, i.e., the search area is limited to the reconstructed pixels of the LCU including the CU and the immediate left neighboring reconstructed LCU. The examples of FIG. 7 show search areas for embodiments in which N=1. In some such embodiments, N=2, i.e., the search area is limited to the reconstructed pixels of the LCU including the CU and the two left neighboring reconstructed LCUs, i.e., the immediate left neighboring reconstructed LCU and its immediate left neighboring reconstructed LCU. The example of FIG. 6 shows a search area for an embodiment in which N=2.

In some embodiments, the search for the best matching block is performed as two one-dimensional (1D) searches, a 1D horizontal search within the confines of the horizontal dimension of the search area and a 1D vertical search within the confines of the vertical dimension of the search area. That is, the block vector (BV) for the matching reconstructed block is restricted such that the selected reconstructed block will be exactly to the left or exactly on top of the CU as illustrated in the simple example of FIG. 6 and the top simple example of FIG. 7. In the example of FIG. 6, N=2, the LCU size is 64×64, and the CU size is 16×16. In this example, the horizontal search range is [−cuWidth, −cuWidth−2*64] and vertical search range is [−cuHeight, −cuHeight−32]. The search ranges for other CU sizes, CU positions, LCU sizes, and values of N can be similarly computed.

In some embodiments, the search for the best matching block is a two-dimensional (2D) search within the search area as illustrated in the bottom simple example of FIG. 7. In such embodiments, the entire search area is searched and the matching reconstructed block is allowed to be anywhere in the search area.

Any suitable search technique and matching criteria may be used to find the best matching block. For example, a 2-step search algorithm may be used. In the first step, a candidate best matching block is searched over a subsampled search area and, the final best matching block is refined among the search points around the previous best matching block. This search can be generalized to an N-step search. The matching criteria may be the SAD (sum of absolute difference) between the CU and a candidate block of reconstructed pixels. In some embodiments, the block vector is restricted to be integer-pel such that a block copy without interpolation may be used. Further, the matching block may not overlap the CU or go beyond the boundaries of the picture.

The search may be performed, for example, by the IBCE component 337 of FIG. 3 using reconstructed pixels stored in the reconstructed picture buffer 330. Note that N left neighboring reconstructed LCUs should be stored in the reconstructed pictured buffer 330. In embodiments in which N=2, the two left neighboring reconstructed LCUs are stored in the reconstructed picture buffer 330. In embodiments in which N=1, the left neighboring reconstructed LCU is stored in the reconstructed picture buffer 330. In embodiments in which N=0, the reconstructed samples of the current LCU are stored in the reconstructed picture buffer 330 and no neighboring LCUs are needed.

Referring again to FIG. 5, once the best matching block of reconstructed samples is found, the cost for using IntraBC mode to encode the CU using the matching block is computed 502. Any suitable technique for computing coding cost may be used, e.g., a rate-distortion coding cost.

If the IntraBC coding cost is better than coding costs of other prediction modes, IntraBC mode is selected 504 for encoding the CU. The quantized transform coefficients for the CU are then computed 506 using the best matching block, i.e., the IntraBC predicted CU. More specifically, the IntraBC predicted CU is subtracted from the CU to generate a residual CU. Block transforms are performed on the residual CU to convert the residual pixel values to transform coefficients and the transform coefficients are quantized.

A predicted block vector is also computed 508 to signal the block vector in the bit stream. In some embodiments in which the two 1D searches are used, a single component of the block vector is signaled in the bit stream along with an indication of the direction (horizontal or vertical) of the block vector. For example, if the direction indicator is 1, the x-component of the block vector is signaled; otherwise, the y-component is signaled. In such embodiments, the predicted block vector is computed as the difference between a predictor and the component to be signaled. In some embodiments, if the x-component is to be signaled, the predictor may be width of the CU and if the y-component is to be signaled, the predictor may be the height of the CU.

In some embodiments, the video coding standard in use may specify predictor values for the x-component and the y-component for each CU size. In such embodiments, the predictor for the x-component of a CU may be a constant that is derived as a multiple of the width of the CU, i.e., predictor=Cx*width, and the predictor for the y-component of a CU may be a constant that is derived as a multiple of the height of the CU, i.e., predictor=Cy*width where $Cx \geq 0$ and $Cy \geq 0$ and Cx and Cy are not limited to integer values.

In some embodiments, the components of a block vector of a neighboring IntraBC encoded CU may be used as predictors. For example, the x-component of the block vector of a previously IntraBC coded CU may be used as the predictor for the x-component of the current block vector. Similarly, the y-component of the block vector of a previously IntraBC coded CU may be used as the predictor for the y-component of the current block vector.

In embodiments in which a 2D search is used and in some embodiments in which two 1D searches are used, both components of the block vector are signaled in the bit stream. In such embodiments, the predicted block vector is computed as the differences between the components of the block vector and corresponding predictors. Further, the x-component and the y-component may be predicted using, for example, the corresponding predictors described for the single component signaling embodiments.

After the quantized transform coefficients and the predicted block vector are computed, a decision 510 is made as to whether or not to IntraBC skip mode can be used for the CU. As was previously explained, if IntraBC skip mode is used, the block vector and quantized transform coefficients for the CU are not encoded in the bit stream. If the quantized transform coefficients and the predicted block vector are all zero, the IntraBC skip mode is used; otherwise, it is not used. When IntraBC skip mode is used, a flag indicating that IntraBC mode is used to encode the CU and a flag indicating that IntraBC skip mode is also used are entropy encoded 514 into the bit stream, e.g., IntraBC mode flag=1 and IntraBC skip flag=1. When IntraBC skip mode is not used, a flag indicating that IntraBC mode is used to encode the CU and a flag indicating that IntraBC skip mode is not used are entropy encoded 516 into the bit stream, e.g., IntraBC mode flag=1 and IntraBC skip flag=0. The predicted block vector and the quantized transform coefficients are also entropy coded in the bit stream.

If IntraBC mode is not selected 504 for the CU, the CU is then encoded 516 according to another selected mode. Further, a flag indicating that IntraBC mode is not used to encode the CU is entropy encoded into the bit stream, e.g., IntraBC mode flag=0.

Note that the IntraBC flag is signaled for each CU. In some embodiments, this flag is coded using one or more IntraBC flags of neighboring CUs as context. Further, in various embodiments, binarization techniques such as, e.g., Huffman code, unary code, fixed length code, Golomb code, etc. and combinations thereof may be used for coding of the predicted block vector.

Figure 8:
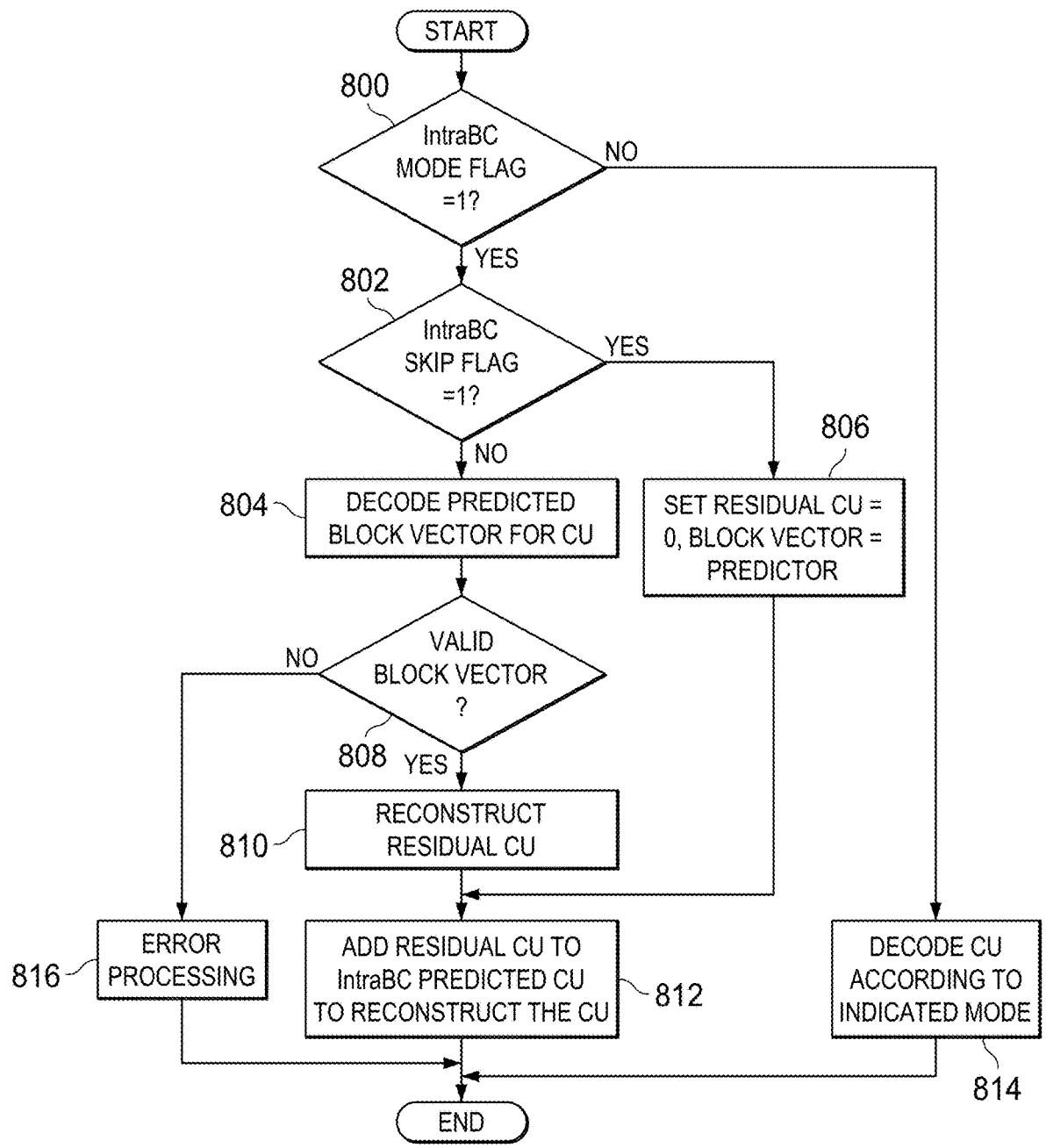

FIG. 8 is a flow diagram of method for decoding a video bit stream in which blocks of pixels may be encoded using IntraBC that may be performed, for example, by the decoder of FIG. 4. For simplicity of explanation, the method is described assuming that a block of pixels is a CU and the CU is not further divided into PUs, i.e., CU=PU. One of ordinary skill in the art will understand embodiments in which a CU is divided into PUs that are encoded using IntraBC.

As previously mentioned, for each CU, an IntraBC flag is signaled in the video bit stream that indicates whether or not the CU is encoded using IntraBC mode. This flag is decoded and, if the value indicates that IntraBC mode is not signaled 800 for the CU to be decoded, the CU is decoded 814 according to another mode indicated in the bit stream. Otherwise, an additional flag is decoded 802 that indicates whether or not IntraBC skip mode was used to encode the CU.

If IntraBC skip mode is indicated 802, then the residual CU for the CU is set to all zeros and the block vector for the CU is set to the predictor(s) used to predict block vectors 806. Predictors that may be used in embodiments of the invention are previously described herein. The residual CU is then added 812 to a block of reconstructed pixels indicated by the block vector, i.e., the IntraBC predicted CU, to reconstruct the CU.

If IntraBC skip mode is not indicated 802, then the predicted block vector for the CU is decoded 804 from the bit stream. The decoding of the predicted block vector includes reconstructing the component value or values of the block vector using the predictor or predictors used by the encoder to compute the predicted block vector. Predictors that may be used in embodiments of the invention are previously described herein.

The decoded block vector is then checked 808 for validity. More specifically, the components of the block vector are checked to ensure that they fall within a specified search area of reconstructed pixels. As previously mentioned, the size of the specified search area may be set by the coding standard in use, e.g., HEVC. On the decoder side, if a decoded block vector falls outside of the specified search area, the bit stream is not regarded as a valid bit stream.

If the block vector is not valid 808, suitable error processing 816 is performed, e.g., decoding of the bit stream may be terminated or some form of error recovery attempted. If the block vector is valid 808, the residual CU is reconstructed 810 from the bit stream. More specifically, the quantized transform coefficients of the CU encoded in the bit stream are decoded, dequantized, and inverse block transforms are applied to the dequantized transform coefficients to reconstruct the values of the residual CU. The residual CU is then added 812 to a block of reconstructed pixels indicated by the block vector, i.e., the IntraBC predicted CU, to reconstruct the CU.

FIG. 9 is a block diagram of an example digital system suitable for use as an embedded system that may be configured to perform IntraBC coding as described herein during encoding of a video stream and/or to decode blocks of pixels encoded using IntraBC during decoding of an encoded video bit stream as described herein. This example system-on-a-chip (SoC) is representative of one of a family of DaVinci™ Digital Media Processors, available from Texas Instruments, Inc. This SoC is described in more detail in "TMS320DM6467 Digital Media System-on-Chip", SPRS403G, December 2007 or later, which is incorporated by reference herein.

The SoC 900 is a programmable platform designed to meet the processing needs of applications such as video encode/decode/transcode/transrate, video surveillance, video conferencing, set-top box, medical imaging, media server, gaming, digital signage, etc. The SoC 900 provides support for multiple operating systems, multiple user interfaces, and high processing performance through the flexibility of a fully integrated mixed processor solution. The device combines multiple processing cores with shared memory for programmable video and audio processing with a highly-integrated peripheral set on common integrated substrate.

The dual-core architecture of the SoC 900 provides benefits of both DSP and Reduced Instruction Set Computer (RISC) technologies, incorporating a DSP core and an ARM926EJ-S core. The ARM926EJ-S is a 32-bit RISC processor core that performs 32-bit or 16-bit instructions and processes 32-bit, 16-bit, or 8-bit data. The DSP core is a TMS320C64x+TM core with a very-long-instruction-word (VLIW) architecture. In general, the ARM is responsible for configuration and control of the SoC 900, including the DSP Subsystem, the video data conversion engine (VDCE), and a majority of the peripherals and external memories. The switched central resource (SCR) is an interconnect system that provides low-latency connectivity between master peripherals and slave peripherals. The SCR is the decoding, routing, and arbitration logic that enables the connection between multiple masters and slaves that are connected to it.

The SoC 900 also includes application-specific hardware logic, on-chip memory, and additional on-chip peripherals. The peripheral set includes: a configurable video port (Video Port I/F), an Ethernet MAC (EMAC) with a Management Data Input/Output (MDIO) module, a 4-bit transfer/4-bit receive VLYNQ interface, an inter-integrated circuit (I2C) bus interface, multichannel audio serial ports (McASP), general-purpose timers, a watchdog timer, a configurable host port interface (HPI); general-purpose input/output (GPIO) with programmable interrupt/event generation modes, multiplexed with other peripherals, UART interfaces with modem interface signals, pulse width modulators (PWM), an ATA interface, a peripheral component interface (PCI), and external memory interfaces (EMIFA, DDR2). The video port I/F is a receiver and transmitter of video data with two input channels and two output channels that may be configured for standard definition television (SDTV) video data, high definition television (HDTV) video data, and raw video data capture.

As shown in FIG. 9, the SoC 900 includes two high-definition video/imaging coprocessors (HDVICP) and a video data conversion engine (VDCE) to offload many video and image processing tasks from the DSP core. The VDCE supports video frame resizing, anti-aliasing, chrominance signal format conversion, edge padding, color blending, etc. The HDVICP coprocessors are designed to perform computational operations required for video encoding such as motion estimation, motion compensation, intra-prediction, transformation, and quantization. Further, the distinct circuitry in the HDVICP coprocessors that may be used for specific computation operations is designed to operate in a pipeline fashion under the control of the ARM subsystem and/or the DSP subsystem.

As was previously mentioned, the SoC 900 may be configured to perform IntraBC coding as described herein during encoding of a video stream and/or to decode blocks of pixels encoded using IntraBC during decoding of an encoded video bit stream as described herein For example, the coding control of the video encoder of FIG. 3 may be executed on the DSP subsystem or the ARM subsystem and at least some of the computational operations of the LCU processing, including the intra-prediction, inter-prediction, and IntraBC prediction of mode selection, transformation, quantization, and entropy encoding may be executed on the HDVICP coprocessors. Similarly, at least some of the computational operations of the various components of the video decoder of FIG. 4, including entropy decoding, inverse quantization, inverse transformation, intra-prediction, IntraBC compensation, and motion compensation may be executed on the HDVICP coprocessors.

Other Embodiments

While the invention has been described with respect to a limited number of embodiments, those skilled in the art, having benefit of this disclosure, will appreciate that other embodiments can be devised which do not depart from the scope of the invention as disclosed herein.

For example, while embodiments have been described herein in which the search area for IntraBC may be specified by the video coding standard, one of ordinary skill in the art will understand embodiments in which the dimensions of the search are specified in other ways. For example, the size used by the encoder may be user specified and signaled to the decoder in the encoded bit stream. In another example, the size may be agreed upon for a particular encoder/decoder application, e.g., for a closed system.

In another example, one of ordinary skill in the art will understand embodiments in which the encoder does not search the entire specified search area for matching blocks, i.e., the encoder limits the area searched within the specified search area to a subset of the search area, e.g., by using the previously described horizontal and vertical 1D searches.

In another example, one of ordinary skill in the art will understand embodiments in which the search area for a particular block of samples to be encoded is determined based on the dimensions of the block, the size of LCUs in the picture being encoded, and the number of neighboring reconstructed LCUs to be searched (see, e.g., FIG. 6). In such embodiments, a decoder may use this information to determine the search area for block vector validation purposes.

In another example, while methods have been described herein in which IntraBC skip mode is provided, one of ordinary skill in the art will understand embodiments in which IntraBC skip mode is not provided.

Embodiments of the methods, encoders, and decoders described herein may be implemented in hardware, software, firmware, or any combination thereof. If completely or partially implemented in software, the software may be executed in one or more processors, such as a microprocessor, application specific integrated circuit (ASIC), field programmable gate array (FPGA), or digital signal processor (DSP). The software instructions may be initially stored in a computer-readable medium and loaded and executed in the processor. In some cases, the software instructions may also be sold in a computer program product, which includes the computer-readable medium and packaging materials for the computer-readable medium. In some cases, the software instructions may be distributed via removable computer readable media, via a transmission path from computer readable media on another digital system, etc. Examples of computer-readable media include non-writable storage media such as read-only memory devices, writable storage media such as disks, flash memory, memory, or a combination thereof.

Although method steps may be presented and described herein in a sequential fashion, one or more of the steps shown in the figures and described herein may be performed concurrently, may be combined, and/or may be performed in a different order than the order shown in the figures and/or described herein. Accordingly, embodiments should not be considered limited to the specific ordering of steps shown in the figures and/or described herein.

It is therefore contemplated that the appended claims will cover any such modifications of the embodiments as fall within the true scope of the invention.

What is claimed is:

1. A method comprising:
   searching a first search area of reconstructed pixels of a picture to locate a first block of reconstructed pixels in the first search area that best matches a first block of pixels in the picture, wherein the first search area consists of a block of reconstructed pixels larger than the first block;
   selecting an intrablock copy mode to encode the first block of pixels based on a cost to encode the first block of pixels using the intrablock copy mode with the first block of reconstructed pixels;
   computing quantized transform coefficients for the first block of pixels using the first block of reconstructed pixels;
   determining a first block vector using the first block of reconstructed pixels as a predictor for the first block vector,
   determining whether to use intrablock copy skip mode based on the quantized transform coefficients and the first block vector;
   encoding in a bit stream a first flag indicating that the intrablock copy mode is used to encode the first block of pixels in the picture;
   encoding in the bit stream a second flag indicating whether the intrablock copy skip mode is used; and
   wherein the first block vector and the quantized transform coefficients are encoded in the bit stream based on the first and second flags.

2. The method of claim 1, further comprising encoding an indicator corresponding to the first block of pixels in the bit stream, wherein the indicator indicates that the first block of pixels is encoded using a block of reconstructed pixels as a predictor.

3. The method of claim 1, wherein the first block of pixels is a coding unit.

4. The method of claim 1, wherein encoding the first block vector comprises encoding an x-component of the first block vector as a difference between a width of the first block of pixels and the value of the x-component.

5. The method of claim 1, wherein encoding the first block vector comprises encoding a y-component of the first block vector as a difference between a height of the first block of pixels and the value of the y-component.

6. The method of claim 1, wherein encoding the first block vector comprises encoding an x-component and a y-component of the first block vector, wherein a value of the x-component is encoded as a difference between a value of an x-component of a block vector of a previously encoded block of pixels and the value of the x-component of the first block vector and a value of the y-component is encoded as a difference between a value of a y-component of the block vector of the previously encoded block of pixels and the value of the y-component of the first block vector.

7. The method of claim 1, wherein searching the first search area further comprises performing a one-dimensional (1D) horizontal search in the first search area and a 1D vertical search in the first search area to locate the first block of reconstructed pixels.

8. The method of claim 1, wherein searching the first search area further comprises performing a two-dimensional (2D) search in the first search area to locate the first block of reconstructed pixels.

9. The method of claim 3, further comprising:
   searching a second search area of reconstructed pixels of the picture for a second block of reconstructed pixels that best matches a second block of pixels, wherein the second search area consists of reconstructed pixels of a second coding unit comprising the second block of pixels and N left neighboring reconstructed coding units of the coding unit, wherein N is one selected from a group consisting of 0, 1, and 2;
   determining that a predicted block vector corresponding to a second block vector indicating a location of the second block of reconstructed pixels in the second search area is zero;
   determining that all quantized transform coefficients corresponding to the second block of pixels are zero, wherein the second block of reconstructed pixels is used as a predictor for the second block of pixels in computing the quantized transform coefficients; and
   encoding an indicator corresponding to the second block of pixels in the bit stream, wherein the indicator indicates that the quantized transform coefficients and the second block vector are not encoded in the bit stream.

* * * * *